Oct. 29, 1946.  W. J. MILLER  2,409,999
APPARATUS FOR PRODUCING POTTERYWARE
Original Filed March 29, 1935   7 Sheets-Sheet 3

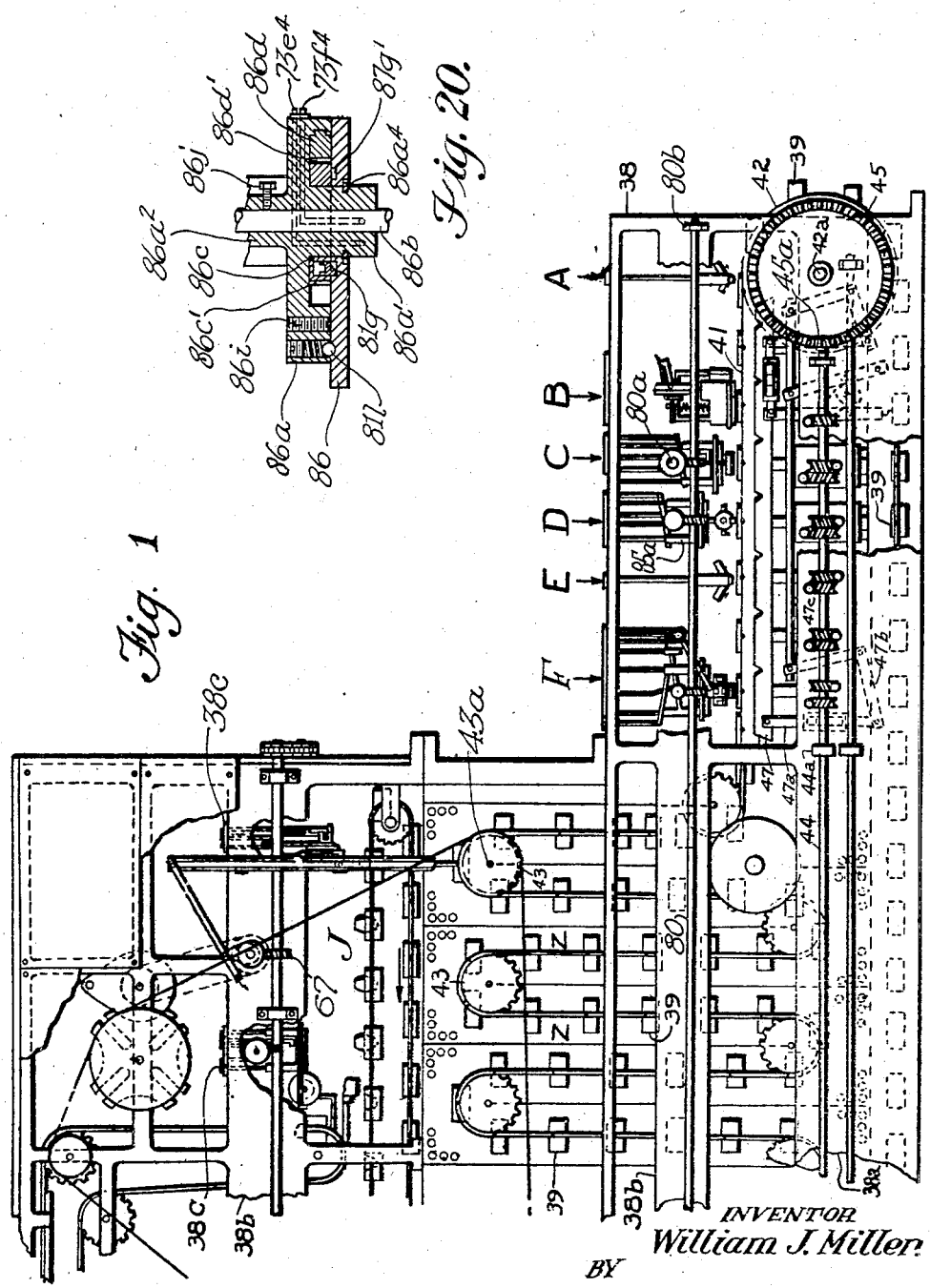

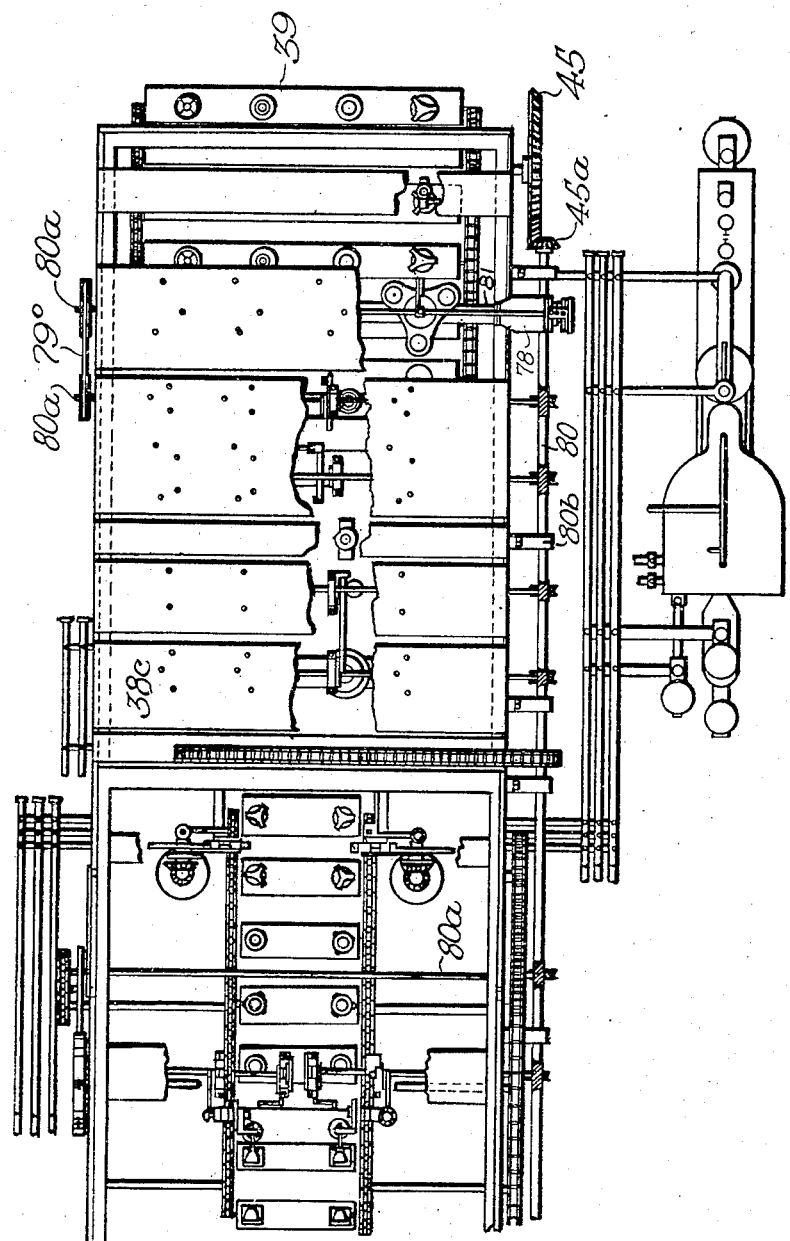

INVENTOR
William J. Miller
BY
George J. Croninger
ATTORNEY

Oct. 29, 1946.  W. J. MILLER  2,409,999
APPARATUS FOR PRODUCING POTTERYWARE
Original Filed March 29, 1935  7 Sheets-Sheet 4
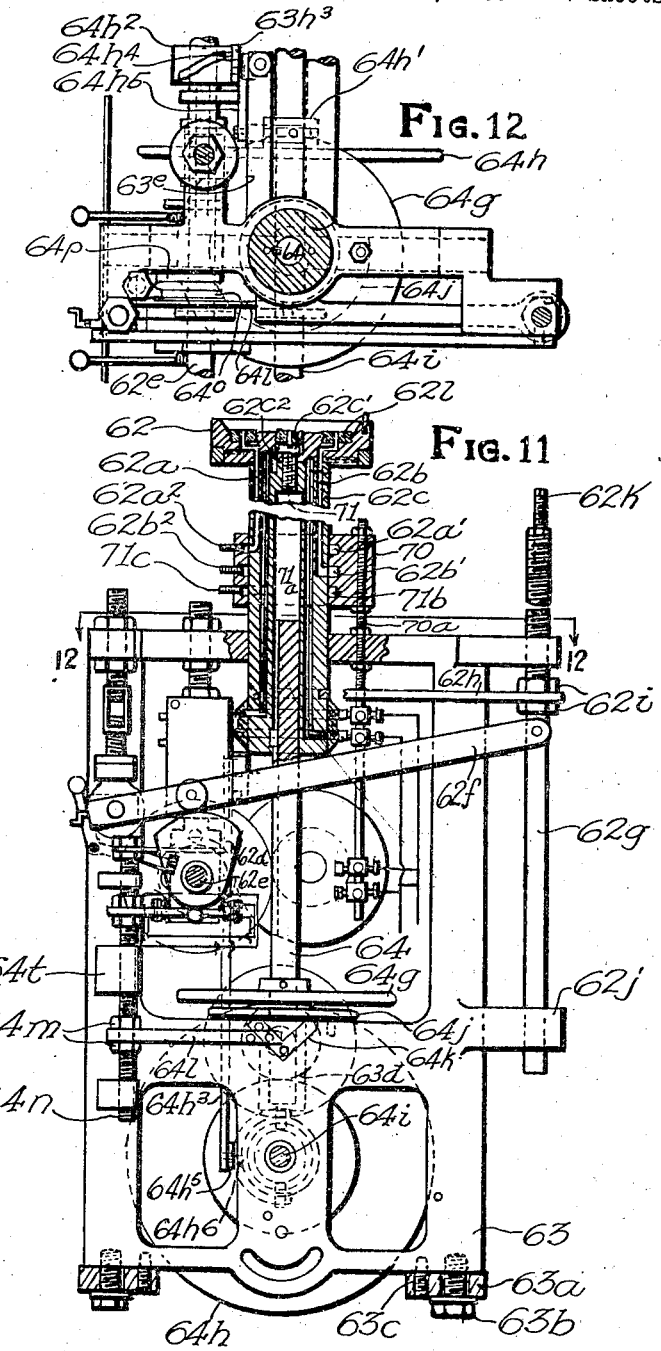
INVENTOR
William J. Miller
BY
George J. Croninger
ATTORNEY

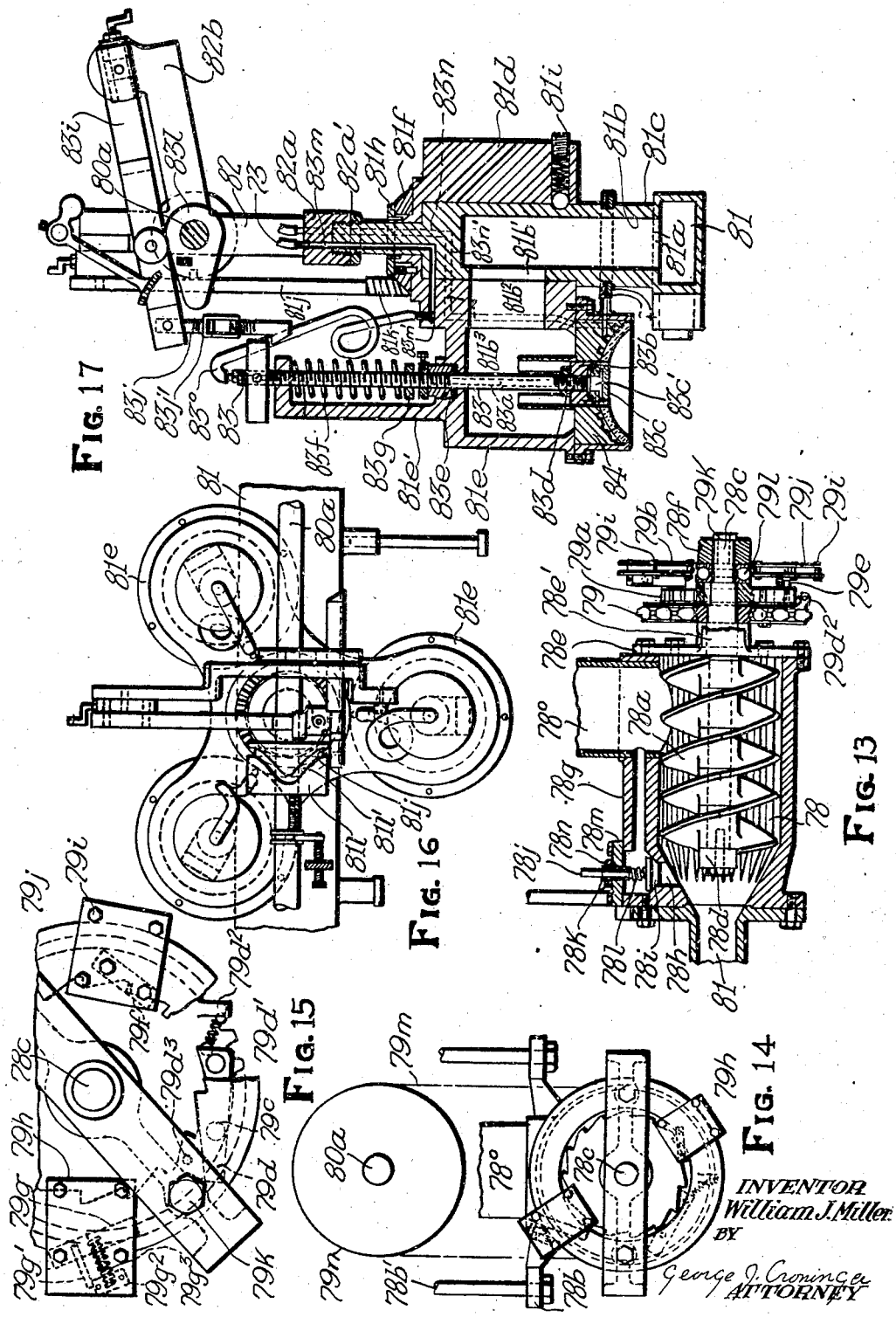

Oct. 29, 1946.  W. J. MILLER  2,409,999
APPARATUS FOR PRODUCING POTTERYWARE
Original Filed March 29, 1935   7 Sheets-Sheet 6
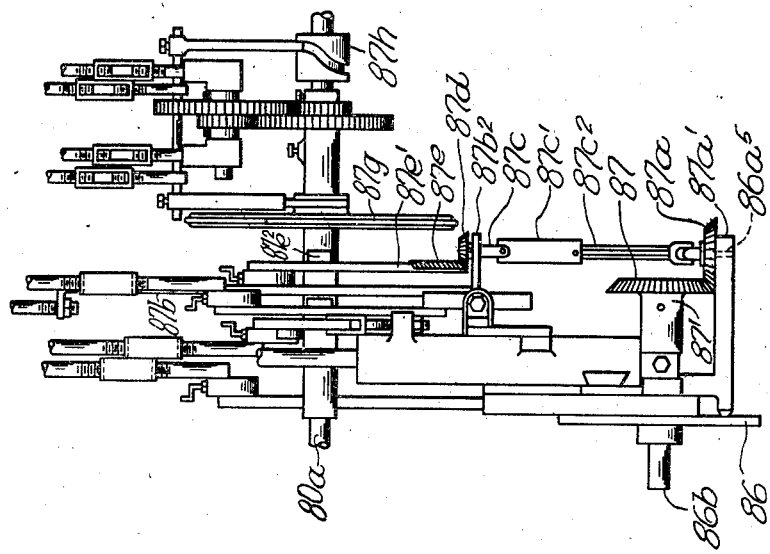
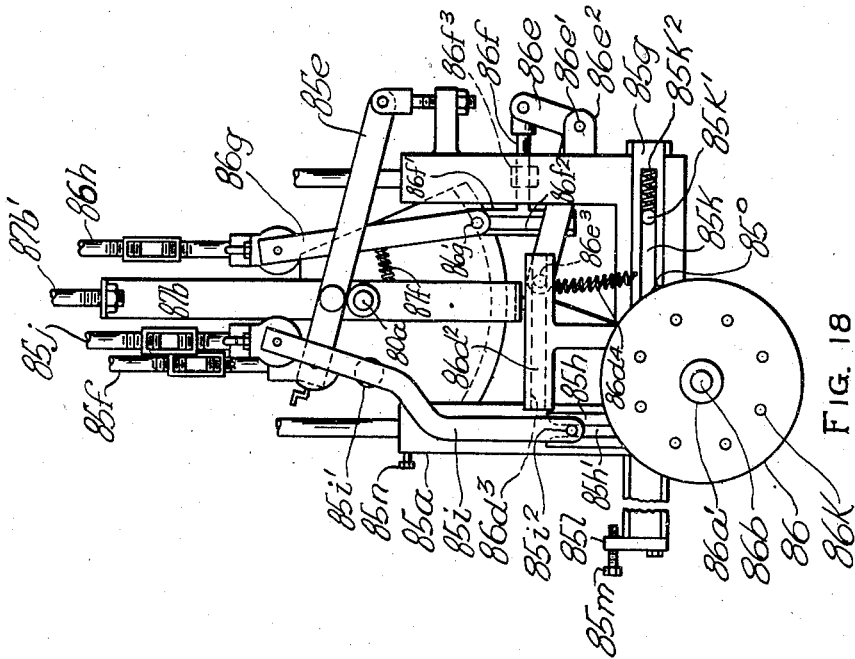
INVENTOR.
WILLIAM J. MILLER
BY
George J. Craninger
ATTORNEY.

Oct. 29, 1946.  W. J. MILLER  2,409,999
APPARATUS FOR PRODUCING POTTERYWARE
Original Filed March 29, 1935  7 Sheets-Sheet 7

INVENTOR
William J. Miller
BY
George J. Croninger
ATTORNEY

Patented Oct. 29, 1946

2,409,999

UNITED STATES PATENT OFFICE 2,409,999

APPARATUS FOR PRODUCING POTTERY WARE

William J. Miller, Pittsburgh, Pa., assignor to Miller Pottery Engineering Company, Swissvale, Pa., a corporation of Pennsylvania Original application March 29, 1935, Serial No. 13,683. Divided and this application August 18, 1945, Serial No. 611,367

30 Claims. (Cl. 25—22)

This application is a division of my co-pending application Serial No. 13,683 filed March 29, 1935.

This invention relates to apparatus for producing pottery ware, and the principal object of the same is to provide an apparatus for making this class of ware more expeditiously and economically than with the known machines now in use, the apparatus possessing numerous advantageous features of construction and operation inaugurated with a view toward improving the grade of ware and at the same time facilitating volume production with a minimum amount of manual attention.

The molds in which the ware is formed and fabricated are disposed on open-bottom trays and the latter mounted in series in an endless flexible, preferably continuously-driven, conveyor which progresses the molds adjacent the various fabricating units and through a drier, and at such points where necessary, the trays are temporarily halted for a fabricating operation, the molds being accessible from above, below and through the sides of the trays, reciprocable and rotatable chucks serving to elevate the molds from the trays and rotate same in operative adjacency to such of the fabricating units as may involve this operation, or the chucks may serve to simply elevate or stabilize the molds during certain fabricating operations, the advancing ware and/or molds being treated and the moisture content thereof regulated in accordance with the successive fabricating operations.

The complete apparatus includes automatically operated units or assemblies for producing ware of various shapes and designs, such for example as plates, cups, bowls, saucers and the like, means being provided for jiggering or shaping certain articles of ware and only such of these units need be placed in operation as may be required in manufacturing a particular line of ware.

Figure 1 shows a view in side elevation of preferred arrangement of various units of the apparatus mounted in cooperative relation with a drier.

Figure 2 shows a plan view of the drier and apparatus as illustrated in Figure 1.

Figure 11 is a view in section and side elevation of a mold-actuating or jigger assembly.

Figure 12 is a horizontal sectional plan view taken on the line 12—12, Figure 11.

Figure 13 is a transverse vertical sectional view of the clay-progressing and compacting means forming part of the assembly for feeding charges of clay to the molds.

Figure 14 is an end view thereof.

Figure 15 is an enlarged view of a portion of Figure 14.

Figure 16 is a plan view of the extruding means forming part of the feeder assembly.

Figure 17 is a view principally in transverse vertical section thereof.

Figure 18 is a view in front elevation of a tool or attachment carriage assembly to which various fabricating tools and attachments are applied.

Figure 19 is a view thereof in side elevation, and

Figure 20 is an enlarged sectional view taken on the line 20—20 of Figure 18.

The various fabricating units which go to make up the complete machine should be mounted in such order along the fabricating line as will permit each operation to be performed in proper sequence in accordance with the article of ware being produced, and the frame of the apparatus is constructed to permit interchanging of the said units as desired. In Figure 1 the units are arranged so that the molds are first cleaned at A, the clay charges fed to the molds at B, the charges prepared for the profile by being preformed at C and the charges shaped or profiled to form same into ware at D, after which the ware moves into the drier.

The skeleton of the main supporting frame is generally indicated at 38, see Figure 1, and has attached thereto or formed integral therewith side beams or plates 38a and 38b which serve to support the various cross shafts as well as the main drive shafts of the apparatus, these side beams being broken away at intervals to show the units in the interior of the machine. The frame is spanned across the top by removably-secured suspension plates 38c which are drilled at various points to permit parts of the apparatus to be secured thereto and suspend therefrom, these plates also being broken away in part to disclose the interior mechanism below, see Figure 2.

Figure 6:
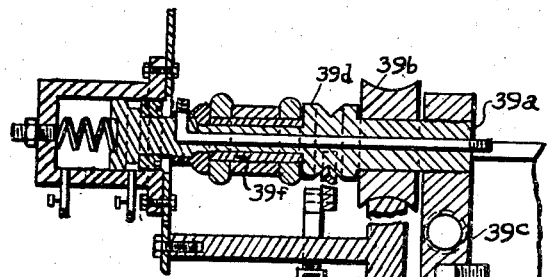
Figure 6 is an enlarged fragmentary, detail, longitudinal sectional elevation of a portion of the tray.

The molds in which the ware is fabricated are disposed on open-bottom trays or carriers 39 which are swingably mounted in series in endless flexible chain conveyors, the conveyor in the main drier being generally indicated at 40, said trays being provided with hollow or longitudinally-bored projecting trunnions 39a, see Figure 6 having rollers 39b rotatably mounted thereon, these rollers having concave peripheries which assist in centering the trays laterally while supported on tracks 41, these tracks being adjustably secured to the frame 38 and serve to support the trays moving in on the right of the apparatus, see Figure 1. The tray trunnions 39a are constructed to cooperate with other units during the various fabricating operations and their preferred construction is clearly shown in Figure 6, said trunnions being removably threaded in the end members 39c of the tray and are formed with an enlarged annular grooved portion 39d which serves to prevent lateral displacement of the rollers 39b. A loose fitting bushing 39f is preferably inserted over the end of the trunnion to provide a bearing for the hollow chain link forming part of the conveyor chain and permit the tray to swing freely without binding.

Figure 5:
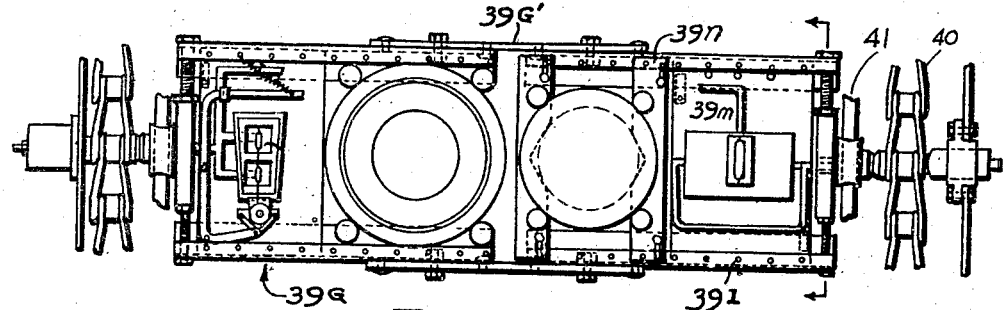
Figure 5 is an enlarged plan view of a preferred form of tray having a number of different types of molds disposed thereon.

The tray frame is preferably of adjustable skeleton construction and comprises side members 39g which are connected for longitudinal adjustment by plates 39g', the side members being of channel construction and formed with a series of mold plate securing holes 39l, see Figure 5, in the flanges thereof, to provide for adjustably mounting mold-supporting plates 39m and/or cross-supports 39n. The cross supports 39n may be notched to receive the mold, an advantage of this construction being that any size of mold may be accommodated by simply spacing the supports relatively to one another, while the plates 39m have a fixed recess which requires annular bushings or rings or analogous devices to provide for varying sizes of molds.

The conveyor chains of the main conveyor 40 are mounted on sprockets 42 and 43, the sprockets 42 being the main drive sprockets and are mounted on cross shafts 42a having bearing in the side plate 38a at opposite extremities of the machine, and the sprocket 43 being guide sprockets which may also serve as drive sprockets for portions of the conveyor and are mounted on shafts 43a which may have bearing in the side frame of the drier. The mold-actuating units are preferably arranged so that they all may be primarily driven from a main drive shaft 44, supported and having bearing in projecting brackets 44a, which may be cast integral with or secured to one of the side beams 38a, and the conveyor drive is taken from this shaft by means of bevel gears 45 secured on the shafts 42a and pinion gears 45a secured on the opposite ends of the drive shaft 44.

Figure 3:
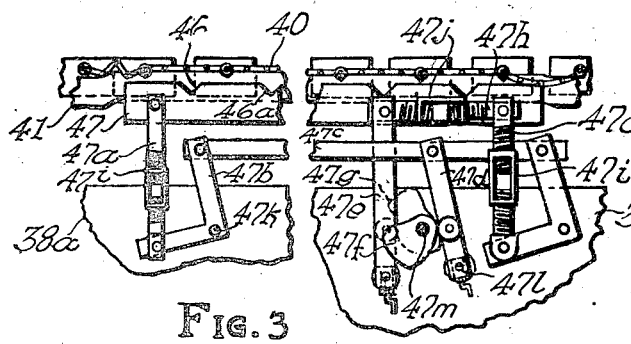
Figure 3 is an enlarged fragmentary view in side elevation of a portion of the conveying mechanism.

To provide for intermittently halting portions of the conveyor without interruption to the main drive, the sprockets 42 at opposite extremities of the machine are driven in synchronism and a certain predetermined amount of slack is provided in the conveyor chain, and at such points along the line where a fabricating operation requires the tray to come to a temporary period of rest, the trays are intermittently advanced at a speed in excess of the normal drive of the conveyor, the slack being periodically accumulated and dissipated on opposite sides of the advanced trays or tray, and the preferred means for accelerating a tray or series of trays is illustrated in detail by Figure 3.

Figure 4:
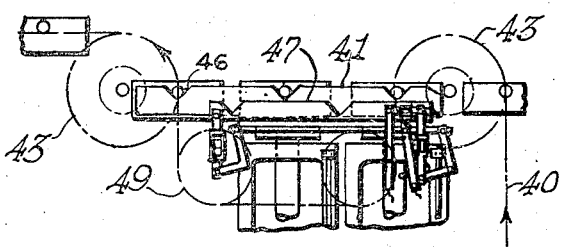
Figure 4 is a similar view of a modification in structure.

The track 41 is preferably formed with tray-positioning notches 46, see Figure 4, where each fabricating operation requiring an inert tray ensues, and parallel with the track a tray-carrying bar 47, also notched at 46a, see Figure 3 is provided which is intermittently reciprocated by means of a system of rods and levers 47a, 47b, 47c, 47d and 47e, and cams 47f and 47g, the rods 47a being pivotally secured at opposite extremities to the bar 47 and bell-crank levers 47b, the latter being pivotally connected by rod 47c which has pivoted thereto the one end of cam lever 47d, which is adapted to be actuated by cam 47g, the rods 47a and 47h being adjustable by means of turnbuckles 47i and 47j. The bell-crank levers are fulcrumed on pins 47k secured in the side plates 38a, and the cam levers 47d and 47e are fulcrumed on pins 47l adjustably secured to said plates, these latter fulcrum connections being adjustable both while in operation and while at rest. Cams 47f and 47g are adjustably secured on shafts 47m having bearing in the plates 38a.

In operation cam 47f actuates lever 47d, which in turn actuates bell crank levers 47b, thereby elevating bar 47, and as this bar rises it lifts the tray trunnions clear of the notches 46, and cam 47g then actuates lever 47e and the trays are advanced to the next succeeding notch, the bar 47 then lowering the trays onto the track and repeating the foregoing cycle of operations.

Figure 7:
Figure 7 is a detail sectional view of a modified form of tray and conveyor trunnion construction.

Figure 4 illustrates how the trays may be automatically disconnected from the conveyor for a fabricating operation and then again connected thereto without halting the conveyor and without utilizing slack to temporarily halt the trays during the normal drive of the conveyor. In this instance the chain is formed with a trunnion 48 which connects with the carrier by means of a hood 48a, see Figures 7 and 8 which is formed on the end of the tray trunnion 39a. The conveyor chain may be positively guided by supplemental sprockets 49 or drop by gravity from engagement with the trays when the latter are deposited on the tracks 41, after which the trays may be progressed forward by the reciprocating bar 47 as in Figure 3 until the chain 40 again engages and lifts them from the tracks to resume their normal travel.

Figure 9:
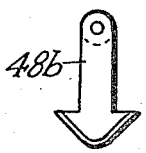
Figures 9 and 10 are detail views of modifications in parts which may be used in the conveying system.
Figure 10:
Figure 8:
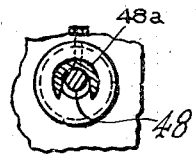
Figure 8 is a view taken on line 8—8 of Figure 7.

Figures 9 and 10 illustrate a modified form of tray-carrying member 48b which may be used in place of the cooperating chain trunnion 48 and hood 48a in Figures 9 and 8, these members 48b being pivotally mounted on the chain trunnions 48 and having a concave hook extremity adapted to receive the tray trunnions, which automatically center or come to rest in the pocket formed thereby when the chains move upwardly to re-engage the carriers.

The molds in which the ware is formed are generally designated by the reference numeral 53 in the drawings and may be of the usual construction.

As the trays bearing the molds progress along the lower main fabricating line, they pass over reciprocable and rotatable chucks 62 at the several stations and forming part of the mold-actuating units shown by Figures 11 and 12. The complete assembly is mounted on a skeleton frame 63 which is adjustably secured on cross supports 63a, by screw bolts 63b, extending through enlarged openings, and centering dowels 63c, the latter being removed in the event it is desired to shift the unit from its initially aligned position. The cross supports 63a are suitably adjustably secured to the base of the main frame 38 of the machine. The casting or frame 63 is provided with a bearing housing for a spindle 64.

The spindle 64 is in spline-sliding engagement with a chuck spindle 62c on which the chuck 62 is secured by a screw 62c' and dowel pin 62c2, reciprocation being imparted to the chuck 62 and spindle 62c by means of a cam 62d, which is adjustably mounted on a cross shaft 62e having bearing in the side frame plates 38a of the main frame of the apparatus, said cam actuating a lever 62f. The pivoting assembly being supported from the frame 63, and at its opposite extremity pivotally secured to a pitman 62g, the pitman connecting with spindle 62c by means of a cross fork 62h, which is adjustably secured to said pitman by nuts 62i at its one extremity and forked into an annular groove in the spindle 62c at its opposite extremity. The pitman 62g projects through and is guided by extensions 62j of the frame 63, the upper end of said pitman having adjustably threaded therein a contact screw 62k, the function of which will later become apparent.

Rotation may be imparted to the spindle 64 in the unit illustrated in Figure 11 by means of cooperating friction gears 64g and 64h, the gear 64g being adjustably secured on the spindle 64 and the gear 64h splined for longitudinal sliding movement on a cross shaft 64i, which is preferably continuously driven, this shaft having bearing at opposite extremities in the side frame plates or beams 38a.

The friction gears 64g and 64h are brought into intermittent contact by a lever and brake assembly comprising a brake shoe 64j formed with studs for mounting the shoe for vertical movement on the frame 63, a bell-crank lever 64k pivoted or fulcrumed in said frame, a connecting rod 64l adapted to be adjustably pivoted at one extremity in any one of a plurality of holes formed in said bell crank lever and at its opposite extremity adjustably secured by nuts 64m on a pitman 64n, and cam-contacting arms 64o and 64p which are also adjustably secured on the pitman 64n by nuts 64q and 64r. These arms 64o and 64p are alternately raised and lowered by separate cams, not shown. The frame 63 is formed with guide brackets 64t for the pitman 64n.

To vary the speed of rotation of the chuck during reciprocation thereof, the splined friction gear 64h is provided with a grooved hub 64h', also splined on shaft 64i, and a grooved cam 64h2 is adjustably secured on shaft 62e, motion being transmitted from the cam to said gear by a lever 64h3, which is adjustably pivotally supported at its upper extremity on a bracket extension 63e of the frame 63, said lever extending downwardly and adjacent cam 64h2 being provided with a pin 64h4 working in the groove of said cam, and at its lower extremity said lever connects with the grooved hub 64h' by a link 64h5 and pin 64h6 working in the groove of said hub.

In operation, the chuck-reciprocating cam 62d and brake cams being adjusted to work in synchronism, when the chuck spindle and chuck elevate, the brake 64j is released, permitting spindle 64 to lower and thus lowering gear 64g into contact with the continuously rotating gear 64h and imparting rotation to the chuck; and when the chuck is lowered, brake 64j is raised and thus contacts with gear 64g and raises the spindle 64, thereby moving gears 64g and 64h out of contact and stopping rotation of the chuck.

To gradually accelerate and decelerate or vary the speed of rotation of the chuck during reciprocation thereof, the drum cam 64h2 and lever 64h3 may be used to move the gear 64h relatively to gear 64g. Ordinarily, however, the brake, if properly adjusted, will operate to effect gradual contact and release of the gears 64g and 64h and provide for smooth operation of the chuck 62.

The shaft 64i, on which the continuously driven gears 64h are splined, and the cam shafts 62e are arranged so that they may be driven from the main drive shaft 44.

Super and sub-atmospheric pressure and other mediums may be applied to the molds through the chuck for various fabricating operations, the passages 62a and 62b extending down into the chuck spindle 62c as shown and opening out into annular registering air grooves 62a' and 62b' formed in a hood 70 having a working fit around said spindle and adjustably supported on the frame 63 by a thread rod 70a, hose nipples 62a2 and 62b2 being threaded into the hood 70 and communicating with said grooves. A further communicating passage opening out in the bottom of the chuck is provided by a bore 71 in the screw 62c', the interior of the spindle 62c being hollow, thus forming a chamber 71a, and the hood 70 having a further groove 71b in communication with said chamber, a hose nipple 71c being threaded into the hood 70 and communicating with said groove. Where the passages 62a, 62b and 71 open out into the chuck 62, resilient sealing and cushioning pads 62l are adjustably threaded into said chuck.

The clay of which the ware is to be formed may be taken from the conditioning apparatus in the usual cartridge or slug form and disposed in a hopper 78o opening into a progressing and compacting chamber 78, Figure 13, having a driven screw 78a working therein, which progresses and compacts the clay into a conduit 81, Figure 16 tending transversely of the machine across the line of molds as they advance on the trays 39, and from this conduit the clay is forced into extruding chambers and extruded and segregated in measured charges into or on the molds by the reciprocating plunger assembly illustrated in Figure 17.

The chamber 78 is formed with a supporting bracket 78B, adapted for posts 78b' which are secured in one of the top plates 38c and by means of which the entire feeder assembly may be adjustably supported over the mold-actuating assembly. The screw 78a is preferably formed in sections and the required number of these sections are assembled on the squared portion of a shaft 78c and secured from endwise displacement by an end cap 78d, said shaft having bearing in a detachable head 78e formed with a hub 78e' and bracket 78f, see Figure 13, the bearing being provided with the usual packing gland and packing to ensure against leakage and wear on the bearing.

The walls of the chamber 78 are preferably fluted longitudinally to prevent angular movement of the clay, and in the top wall a return passage 78g is formed, the inlet 78h of which is shaped to seat a valve 78i provided with a stem 78j having a sliding fit in an exteriorly-threaded sleeve 78k against the resistance of a spring 78l, said sleeve being adjustably threaded in a cover plate 78m and secured by lock nut 78n, and the outlet of said passage opens into the hopper 78o. By adjusting sleeve 78k, the unseating pressure of valve 78i may be regulated to thereby regulate the operating pressure in the conduit 81. When the valve unseats, clay is permitted to pass through the return passage 78g back into the hopper 78o.

The screw 78a is preferably but not necessarily intermittently driven by a continuously-rotating sprocket gear 79, which is rotatably mounted on shaft 78c, and an intermittently-rotating ratchet gear 79a, which is splined on said shaft by a key 79b, the said sprocket 79 having a pivot pin 79c secured therein for pivotally mounting a dog 79d adapted to engage the teeth of the ratchet gear 79a. The dog is pivoted at an intermediate point and has secured in one side thereof a contact pin 79e which makes alternate contact with trip cams 79f and 79g, see enlarged end view Figure 15, these cams being mounted in a radial path of said pins 79e on blocks 79h, which are angularly adjustably secured or clamped by bolts 79i on a ring 79j, which in turn is secured to the bracket 78f by screw bolts 79k. The cam 79f, which throws the dog 79d out of mesh with the teeth of the ratchet gear 79a, may be rigidly secured to block 79h, but it is preferred to mount cam 79g, which throws the dog into mesh with the teeth of said gear, resiliently to ensure against breakage or jamming in case said dog should come down on top of one of the teeth of the ratchet. The cam 79g is therefore pivoted at one extremity on block 79h and has secured therein a stop pin 79g' which normally contacts with a block 79g2 in which a spring 79g3 is seated, trip cam 79g being maintained under resilient pressure by said spring. To maintain the dog 79d in tripped position, a ball and socket spring 79d' is seated at one end in the said dog and at its opposite end seated in a lug 79d2 formed on the sprocket gear 79, said spring exerting resilient pressure on the dog in a longitudinal plane in line with its axis, it will snap back into or out of mesh with the teeth of ratchet 79a. To limit the disengaged position of dog 79d, a stop pin 79d3 is secured in the side of gear 79.

A thrust bearing 79l, see Figure 13 is applied on the shaft 78c between a shouldered portion of said shaft and the bracket 78f.

In operation, the continuously-rotating gear 79 carries its pivotally-mounted dog around the periphery of ratchet 79a, the dog being alternately thrown into and out of mesh with said ratchet by trip cams 79g and 79f, and as these cams are adjustable by shifting the position of blocks 79h on their supporting ring 79j, the travel of ratchet 79a and screw 78a may be varied as desired.

Reverting briefly to Figure 1 power for driving the screw 78a may be taken from a shaft 80 which extends along the side of the machine, motion being transmitted from this shaft to the various cross shafts 80a for the lower line of fabricating units by means of helical gears 67 and 67a similar to those used for the shaft 44 and cross shafts 62e. The shaft 80 has bearing in bracket 80b and the cross shafts 80a have bearing in the side frame plate 38b, as heretofore specified.

The shafts 80 and 44 are provided with sprocket gears and connected by a sprocket chain or analogous member 80c and driven in synchronism.

The sprocket gear 79 is connected by a chain or analogous member 79m with a sprocket gear 79n secured on one of the cross shafts 80a, this particular shaft being connected with an adjacent cross shaft 80a by a sprocket chain 79o, see right hand portion of Figure 2 instead of being driven direct from shaft 80.

Referring now to Figure 17, the clay compacting in the conduit 81 is forced upwardly through openings 81a, formed in the top of the said conduit wherever the extruding assembly is to be installed, and into a chamber 81b formed in a pivot post 81c, and from the chamber 81b the clay passes through registering openings 81b' and 81b2, respectively formed in the side wall of the post 81c and the hub of a pivoted turret casting 81d, and into one of a series of chambers 81b3 formed in a multiple of radial cylinders 81e forming part of the turret 81d, from which the clay is extruded into or on the molds. While the clay could be extruded direct from the conduit 81 onto the molds, the construction here shown is adapted for producing different kinds of ware in succession, as where plates, cups and saucers are being formed in one line of molds. The turret 81d, therefore, may be rotated on the pivot post 81c in synchronism with the mold conveyor to bring each cylinder over a mold as it is advanced in line if different types of molds are in the same line. However, this operation may not be desired in many instances, as where the same type of ware is being produced in one line and where the mold-receiving or upper die is adapted for different shapes of ware, as will hereinafter become apparent.

The upper extremity of the turret 81d is formed with a shoulder and trunnion to receive a gear 81f, which is rotatably mounted thereon, the gear being recessed to house a resiliently mounted latch or detent the shoulder being formed with a number of recesses in accordance with the number of extruding cylinders 81e, here three. After the gear and detent assembly have been applied, the gear is secured from displacement by a cap 81h. The side of the turret 81d is also bored to receive a spotting or positioning detent assembly 81i, and the side wall of the pivot post 81c is formed with a plurality of notches, here three, so that when the turret is rotated to its approximate angular position, it is spotted by said detent.

The upper extremity of the pivot post 81c is threaded and thereon is adjustably mounted a lever-supporting bracket or post 82, the lower extremity of which is rounded and enlarged as at 82a and threaded over the post 81c and secured by lock nut 82a', said bracket 82 also being cast with a branch bracket 82b. On the upper extremity of this bracket 82 a lever 81j is adjustably pivoted, said lever 81j terminating in a gear segment 81k, which is in continual mesh with the turret gear 81f. The lever 81j is oscillated by a groove cam 81l, see Figure 16, which is formed with a groove 81l' and adjustably secured on the shaft 80a, said lever being provided with a pin 81j' which engages in said grooves.

As the cam 81l rotates, lever 81j is oscillated, thus oscillating turret gear 81f, the length of the stroke being adjusted in accordance with the angular spacing of the detent slots in the shoulder of the turret 81d. Thus if the turret is to be intermittently rotated counter-clockwise, the detent is turned so that the toe of its beveled end faces in that direction, and if clockwise, the detent is simply turned in its socket accordingly, while if the turret is to be oscillated back and forth, the detent is turned to an intermediate position.

As the clay is progressed into the chambers 81b3 it is extruded therefrom in measured charges by reciprocating plungers, each of which comprises a stem 83, which is hollow or formed with a longitudinal bore 83a, the lower extremity of the plunger being threaded to adjustably receive a socket 83b, in which is threaded a porous head 83c composed of material such as plaster of Paris and having a chamber 83c' therein, the bore 83a terminating in said chamber. The head may be secured in adjusted position by a lock nut 83d. The stem 83 extends upwardly through the top of the cylinder 81e, which is provided with a packing gland 83e, said cylinder being formed with an extension guide bracket 81e' for said stem, the latter moving upwardly against the compression of a spring 83f, which encircles the stem 83 and is adjustable by a collar 83g threaded on the stem 83, to adjust the lowermost point of the reciprocation or travel of the plunger.

The extruding plungers are forced upwardly against the compression tension of springs 83f by a lever 83i, adjustably pivoted at one extremity on the bracket 82b, and at its opposite extremity said lever has pivotally mounted thereon a hook 83j, adjustable by turn-buckle 83j', said hook engaging under a collar 83k, which is adjustably secured on each plunger stem 83. Lever 83i is actuated by a cam 83l, which is adjustably mounted on the shaft 80a.

Means are provided for applying a treating medium, such as super and sub-atmosphere, electricity or other fluid to the clay charges, the rounded part 82a of bracket 82 and the upper extremity of post 81c being formed with registering bores or passages 83m and 83n which register with bores or passages 83m' and 83n' formed in the turret 81d, the passage 83m' connecting with the plunger bore through a hose 83o and the passage 83n' leading down through the turret and terminating in an upper die or former generally designated by the numeral 84 and which will now be described. The passages 83m and 83n are provided with nipples for attaching the hose 73 thereto for the control valves 72, Figure 12.

To provide for progressing different grades and mixtures of clay into one conduit and feeding a particular mix or grade into a particular advancing line or lines of molds, it is preferred to mount the progressing and compacting assembly shown in Figure 13 at both ends of the conduit 81, and the extruding orifices along the conduit may be separated from one another by slide valves 81m. Thus a certain grade or mix of clay may be progressed into each end of the conduit and maintained separate by the slide valves, or if it should be desired to feed a different grade or mix of clay to each line of molds, a separate feeding chute and screw could obviously be provided for each extruding assembly.

The feeder assembly as a whole is adapted for use with the mold-actuating units described in connection with Figs. 9 and 11, and it will be seen that the charges of clay may be treated on all sides, viz.: through the plunger head 83b, upper die or former and the mold.

The operation of the feeder should now be understood. The clay may be deposited in the hopper 78o in the usual cylindrical roll as it is taken from the conditioning apparatus, the screw 78a being intermittently actuated to progress and compact the clay in a homogeneous mass into the conduit 81, from which it is forced upwardly through the chamber 81b. If the turret is to be rotated to feed different types of molds in succession, the detent 81g is turned in the proper direction, and as the openings 81b' and 81b2 register, the clay passes into the chamber 81b3, from which the feeding plungers eject or extrude and segregate it in measured charges against the molds, which are preferably elevated to the upper die and form a confining chamber substantially bounded on all sides by porous material and into which the clay is extruded, the descending plunger completing the walls of the chamber. The feeding plungers need only be raised to a point sufficient to permit approximately the correct quantity of clay to pass into the feeding orifices, the side walls of which form an accumulating chamber or well, and at which time it is preferred to partially rotate the screw 78a, whereupon the descending plungers move into the orifices and eject the clay in the form of a column onto the molds with sufficient force to cause it to adhere thereto, and it is preferred to adjust the mold-actuating mechanism so that the molds meet the extruding column, which through contact with the side walls of the extruding orifice assumes a bulbous shape, the column spreading radially over the molds and expelling the air from the gradually closing chamber, until the molds and upper dies meet, at which time or shortly thereafter the charge is completely extruded by the descending plunger head.

It is preferred to leave a clearance space between the plunger head 83c and side walls of the extruding orifice or well, to permit back extrusion of excess material into the chamber 81b3.

By establishing a sub-atmospheric condition between the chuck and mold, the latter will be held firmly on the chuck and be prevented from sticking to the upper die if there should be any tendency in that direction. In the event it is desired to apply super-atmospheric pressure to the under-portion of the mold, the chuck may be magnetized to maintain the mold and chuck in association.

It will be seen that the drying of the ware and extent and time of adhesion and/or release of the ware relatively to the mold walls is under artificial control and therefore may be positively timed to conform with the various fabricating operations as the ware is advanced along the fabricating line without retarding or delaying production.

Many of the fabricating tools and attachments are mounted on a standard form of carriage assembly substantially similar to that illustrated in Figures 18 and 19, for the purpose of giving them the desired movements relatively to the ware on which they are to perform.

The reference numeral 85 designates vertical guide and stop posts which are adjustably secured in and depend from one of the top plates 38c of the machine, see Figure 1, a frame 85a shown as of rectangular shape being mounted to have a vertical sliding fit on said posts, nuts 85b being threaded on the lower extremities of said posts to adjustably limit the lowermost point of travel of said frame. The frame 85a is formed with a bracket 85c, which is bored to receive a pivot bolt 85d, which is adjustably secured by nut 85d', a lever 85e being pivoted at one extremity in said bolt and at its opposite extremity adjustably and pivotally supported from a post 85f, which also depends from and is secured in the top plate 38c. This lever 85e is provided with a cam roller 85e' adapted for contact with various types of frame-actuating cams shaped in accordance with the work involved and which are mounted on one of the cross shafts 80a, or if the variable speed assembly is used, on the sleeve 68, these cams being shown in connection with the various attachments hereinafter described.

The lower portion of the frame 85a is formed with a dove-tail slot or groove in which a bar 85g is mounted to have a horizontal sliding fit, the bar at the left as viewed in Figure 18 being formed with a vertical guide bracket 85h having a central slot or track 85h'. A lever 85i provided with a cam roller 85i' is pivotally and adjustably supported at its upper extremity from a post 85j, and at its lower extremity said lever is provided with a pin 85i2 adapted to have a working fit in said track 85h'. As in the case of lever 85e, the cams for the lever 85i are given the required contour in accordance with the work involved and are mounted on one of the cross shafts 80a or sleeve 68, each attachment generally requiring a particular contoured cam which is illustrated in connection with the attachment.

The bar 85g is slotted at 85k, a pin 85k' being secured in the frame 85a, a compression spring 85k2 being mounted to abut at opposite ends, respectively, against said pin and the bar 85g. The bar 85g is also provided with a screw bracket 85l in which a contact screw 85m is mounted, which serves to adjustably limit the movement of bar 85g in one direction independently of its cam travel or reverse movement. The screw bracket 85l is adapted to be attached at either end of bar 85g and the spring 85k2 at either end of slot 85k, to conform to the positive direction of movement of the cam lever 85i.

It will be seen that when levers 85e and 85i are oscillated, the frame 85a reciprocates vertically and the bar 85g laterally, the bar deriving its vertical movement from said frame. The frame is provided with screws 85n and 85o adapted to be adjusted in contact with the posts 85 and frame 85a in the event the actuating cams are to be disconnected and the frame and bar set in rigid adjusted position.

An attachment and tool-mounting turret disk 86 is supported from the slide bar 85g by means of a hanger bracket 86a, said bracket being formed with projecting hub portions 86a' and 86a2, see Figure 20 and is secured to the bar 85g by screws 86a3, see Figure 19, the disk 86 being rotatably mounted on the hub 86a' and prevented from lateral displacement by a ring 86a4. A shaft 86b extends through and has bearing in the projecting hubs of bracket 86a, this shaft functioning in a manner which will later become apparent. The disk, like the feeder turret 81d, may be rotated intermittently in one direction or oscillated, the detents 81g and 81i being housed, respectively in a gear 86c and the bracket 86a and adapted to register in detent or latch notches 81g' and spotting notches 81i' formed in one side of said disk 86, there being four of each of said notches in the present instance. The gear 86c is mounted to rotate free on the bracket hub 86a' and the teeth 86c' of said gear are in continual mesh with the teeth 86d' of a rack 86d, the latter being slidably dove-tailed into a groove formed in the bracket 86a, see Figure 20, and terminating in a T-head 86d2, see Figure 18, which is formed with a track 86d3. The rack 86d is actuated by a bell-crank lever 86e, which is fulcrumed at 86e' on a bracket extension 86e2 formed on the frame 85a, the one extremity of said lever 86e being provided with a pin 86e3 which has a sliding fit in the groove or track 86d3, while the opposite extremity of said lever has pivoted thereto a connecting rod 86f which extends through a guide bracket 86f3 and terminates in a T-head 86f' formed with a groove or track 86f2, said T-head cooperating with a lever 86g pivotally supported at its upper extremity from a post 86h, which is secured in one of the top frame plates 38c, and at its lower extremity said lever is provided with a pin 86g' having a sliding fit in the groove or track 86f2 of T-head 86f'. Lever 86g is provided with a cam roller 86g2 adapted to contact with a suitably shaped cam to be mounted on shaft 80a, these cams also being generally shown with the respective attachments hereinafter described. A retracting spring 86d4 is secured at opposite extremities, respectively, to the T-head 86d2 and the bar 85g.

A screw 86i is shown as threaded in the bracket 86a, see Figure 20, this screw being adjusted against the turret disk 86 when it is desired to maintain said disk stationary with said bracket. A screw 86j is also shown threaded in the hub 86a2 of bracket 86a, and this screw may be adjusted against the shaft 86b when it is desired to maintain the latter stationary with said bracket.

The disk 86 is provided with a plurality of holes 86k for attaching various fabricating tools and attachments, such as shaping tools, turning and finishing tools and transfer chucks, which will be described in connection with each respective fabricating operation.

The shaft 86b may be driven by either a positive or friction drive.

A bevel gear 87, formed with a hub 87', is shown as adjustably secured on the shaft 86b, this gear meshing with a similar gear 87a secured on a stub shaft 87a' which has bearing in the projecting extremity of a bracket arm 86a5 formed as part of the bracket 86a. A bracket 87b is adjustably supported by a post 87b' from one of the top frame plates 38c and extends down and at its lower extremity is formed with a foot 87b2, a stub shaft 87c having bearing in said foot, this shaft forming part of a flexible coupling comprising a sleeve 87c' and longitudinally grooved shaft 87c2 in spline-sliding engagement with said sleeve, the lower extremity of shaft 87c2 being coupled for universal movement with the stub shaft 87a' on which gear 87a is secured. The stub shaft 87c of the flexible coupling has adjustably secured thereon a pinion gear 87d. If pinion 87d is used, the drive is effected by means of a segmental gear 87e formed on a lever 87e', which is adjustably pivotally mounted on the bracket 87b and provided with a cam roller 87e2 adapted to contact with a cam to be mounted on shaft 80a or sleeve 68 and which may be given various contours in accordance with the rotation desired for shaft 86b. The lever 87e' may be retracted by a spring 87f.

If the rotation of shaft 86b is to be alternately reversed, the drum cam 87h may be used, this cam movement causing the friction gear 87g to move across the face of gear 87d', and when the gear 87g passes over the vertical axis of gear 87d', the rotation of said gear will be halted and then reversed, thus reversing the drive on said shaft 86b.

Some of the fabricating attachments are shown mounted directly on the turret disk 86 while others are shown mounted on a turret 88, which is secured to the disk 86 by screws 88a. This turret may be rotated in accordance with the particular attachments in use. If there are four attachments on the turret and all are being used in succession, the lever 86g may be actuated by a cam.

Super and sub-atmosphere, electricity and other fluid mediums may be communicated to the various fabricating attachments that may be applied to the turret disk 86, see Figure 20.

Hose nipples 73e4 and 73f4 are secured in the bracket 86a, see Figure 20, for connection of the air or fluid lines leading to control valves.

Figure 21:
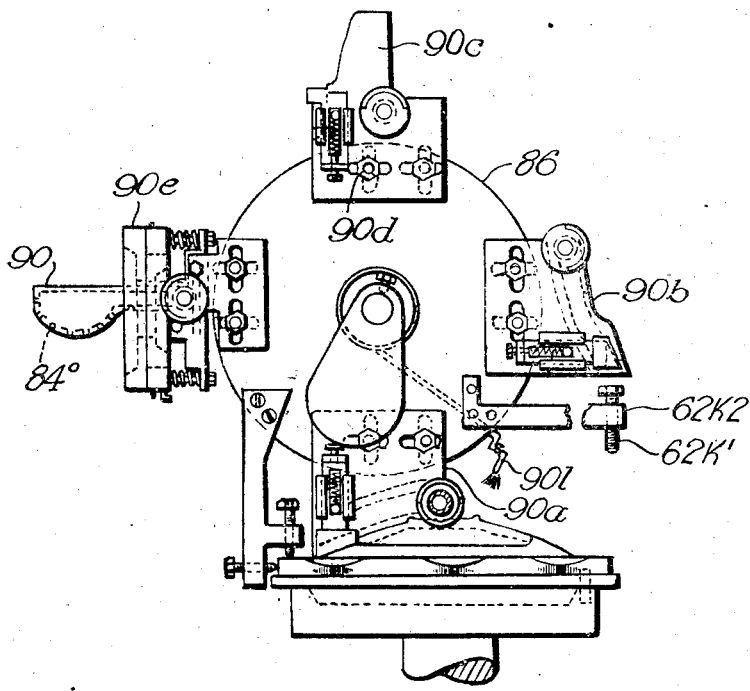
Figure 21 is a view in front elevation of the profile and trimmer assembly.

The profile and trimmer assemblies are shown in Figure 21 as being mounted directly on the turret disk 86, there being four profiles 90, 90a, 90b and 90c shown, so that four different kinds of ware may be shaped in succession, or the turret disk oscillated to alternately move any two profiles into operative position. The profiles are adjustably secured to the disk 86 by slotting the disk and profile at right angles to receive attaching bolts as at 90d. Excess material openings 84o, sloped so as to present a scooping edge counter to rotation of the mold, are preferably formed in the profiles, these openings terminating in a cavity or channel.

The profile 90 is for undercut ware, and is provided with a resiliently mounted brim-forming ring 90e having a brim-contacting porous or plaster insert.

To ensure accurate positioning of the profile relatively to the molds and uniform thickness of the ware, a contact screw 62k' may be adjustably mounted in a bracket 62k2 secured to the turret disk 86, said screw being adjusted to contact with screw 62k threaded into the top of the pitman 62g, Figure 11. When the mold and profile reach their approximate operative positions, the screw 62k and 62k' contact and the profile moves a short distance in unison with the mold.

A suitable fluid such as water may be automatically applied to the clay charge during profiling through the passages 73e and 73f, one of which in Figure 21 is shown as having a tube connected thereto which terminates in a valved nozzle 90l. The fluid may be controlled by one of the valves 72.

A bracket 95c carrying screws 92a and 92b may obviously be applied to the turret disk 86 for each profile assembly, and the use of this feature is not confined to the production of irregularly shaped ware, but said screws may serve as an alternate means or in addition to horizontal limiting screws 85m and vertical profile-limiting screws 62k and 62k', for definitely limiting the horizontal and vertical operating positions of each profile assembly.

Referring to the treating nozzles, Figure 11, operate on the molds at "A" and place them in condition to receive the charges of clay from the feeder at "B." At "C" the operation is optional, this being the performing unit. At "D" the profiles and trimmers are mounted and shape the soft clay into ware.

The trays 39 are intermittently advanced under these various units by the apparatus described in connection with Figure 3, the conveyor chain being provided with slack to accommodate this method of conveyance, and as each tray comes to rest in a definite position over the chucks 62, Figure 11, these chucks rise and elevate the molds from the trays to provide a stable support for and definitely position the molds and also cooperate therewith to apply super and/or sub-atmosphere, electricity and analogous mediums to the molds and ware to assist in the fabricating operations.

I claim:

1. Apparatus for manufacturing dinnerware and the like, comprising a support for carrying molds through a fabricating zone, means for forming ware on said molds in said zone, and a mold conveyor formed for depositing empty molds directly on said support and removing loaded molds directly therefrom and carrying them away.

2. Apparatus for manufacturing dinnerware and the like, comprising an intermittently moving support for molds for carrying them through a fabricating zone, means for forming ware on said molds in said fabricating zone, and a continuously traveling endless mold conveyor formed for depositing empty molds directly upon said support and removing loaded molds directly therefrom while said support is at rest.

3. Apparatus for manufacturing dinnerware and the like, comprising a unitary support for carrying molds through a fabricating zone, means for forming ware on said molds in said zone, and a mold conveyor formed for depositing empty molds directly on and removing loaded molds directly from said support.

4. Apparatus for manufacturing dinnerware and the like, comprising an intermittently moving unitary support for molds for carrying them through a fabricating zone, means for forming ware on said molds in said fabricating zone, and a continuously traveling endless mold conveyor formed for depositing empty molds directly on and removing loaded molds directly from said support.

5. Apparatus for manufacturing dinnerware and the like, comprising a support for carrying molds through a fabricating zone, means for forming ware on said molds in said zone, and a mold conveyor formed for setting empty molds directly upon said support and for lifting loaded molds off the support and carrying them away.

6. Apparatus for manufacturing dinnerware and the like, comprising a horizontal support provided with spaced recesses therethrough for receiving molds, means for indexing said recesses from station to station, means for forming ware on the molds at some of said stations, a plurality of mold-carrying members, and means for moving said members downwardly through successive recesses at one of said stations and upwardly through successive recesses at another of said stations, whereby molds are deposited on said support by said downwardly moving members and removed from the support by said upwardly moving members.

7. Apparatus for manufacturing dinnerware and the like comprising a support for carrying molds being intermittently moved through a fabricating zone, jiggering means for fabricating ware on the molds in said zone and a mold conveyor formed for depositing empty molds on said carrying means and removing filled molds therefrom and carrying them away.

8. Apparatus for manufacturing dinnerware and the like comprising a support for carrying molds being intermittently moved through a fabricating zone, jiggering means for fabricating ware on the molds in said zone and a continuously moving mold conveyor formed for depositing empty molds on said support and removing filled molds therefrom and carrying them away.

9. Apparatus for manufacturing dinnerware and the like, comprising a support for carrying molds through a fabricating zone, profiling means for forming ware on said molds in said zone, and a mold conveyor formed for depositing empty molds directly on said support and removing loaded molds directly therefrom and carrying them away.

10. Apparatus for manufacturing dinnerware and the like, comprising an intermittently moving support for molds for carrying them through a fabricating zone, profiling means for forming ware on said molds in said fabricating zone, and a continuously traveling endless mold conveyor formed for depositing empty molds directly upon said support and removing loaded molds directly therefrom while said support is at rest.

11. Apparatus for manufacturing dinnerware and the like, comprising a unitary support for carrying molds through a fabricating zone, profiling means for forming ware on said molds in said zone, and a mold conveyor formed for depositing empty molds directly on and removing loaded molds directly from said support.

12. Apparatus for manufacturing dinnerware and the like, comprising an intermittently moving unitary support for molds for carrying them through a fabricating zone, profiling means for forming ware on said molds in said fabricating zone, and a continuously traveling endless mold conveyor formed for depositing empty molds directly on and removing loaded molds directly from said support.

13. Apparatus for manufacturing dinnerware and the like comprising a support for carrying molds through a fabricating zone, profiling means for forming ware on said molds in said zone, and a mold conveyor formed for setting empty molds directly upon said support and for lifting loaded molds off the support and carrying them away.

14. Apparatus for manufacturing dinnerware and the like, comprising a support for carrying molds through a fabricating zone, a die for pressing clay on said molds in said zone, and a mold conveyor formed for depositing empty molds directly on said support and removing loaded molds directly therefrom and carrying them away.

15. Apparatus for manufacturing dinnerware and the like comprising an intermittently moving support for molds for carrying them through a fabricating zone, a die for pressing clay on said molds in said fabricating zone, and a continuously traveling endless mold conveyor formed for depositing empty molds directly upon said support and removing loaded molds directly therefrom while said support is at rest.

16. Apparatus for manufacturing dinnerware and the like comprising a unitary support for carrying molds through a fabricating zone, a die for pressing clay on said molds in said zone, and a mold conveyor formed for depositing empty molds directly on and removing loaded molds directly from said support.

17. Apparatus for manufacturing dinnerware and the like, comprising an intermittently moving unitary support for molds for carrying them through a fabricating zone, a die for pressing clay on said molds in said fabricating zone, and a continuously traveling endless mold conveyor formed for depositing empty molds directly on and removing loaded molds directly from said support.

18. Apparatus for manufacturing dinnerware and the like comprising a support for carrying molds through a fabricating zone, a die for pressing clay on said molds in said zone, and a mold conveyor formed for setting empty molds directly upon said support and for lifting loaded molds off the support and carrying them away.

19. Apparatus for manufacturing dinnerware and the like, comprising a support for carrying molds through a mold charging zone, means for feeding charges of clay to said molds in said zone, and a mold conveyor formed for depositing empty molds directly on said support and removing loaded molds directly therefrom and carrying them away.

20. Apparatus for manufacturing dinnerware and the like comprising an intermittently moving support for molds for carrying them through a mold charging zone, means for feeding charges of clay to said molds in said mold charging zone, and a continuously traveling endless mold conveyor formed for depositing empty molds directly upon said support and removing loaded molds directly therefrom while said support is at rest.

21. Apparatus for manufacturing dinnerware and the like comprising a unitary support for carrying molds through a mold charging zone, means for feeding charges of clay to said molds in said zone, and a mold conveyor formed for depositing empty molds directly on and removing loaded molds directly from said support.

22. Apparatus for manufacturing dinnerware and the like comprising an intermittently moving unitary support for molds for carrying them through a mold charging zone, means for feeding charges of clay to said molds in said mold charging zone, and a continuously traveling endless mold conveyor formed for depositing empty molds directly on and removing loaded molds directly from said support.

23. Apparatus for manufacturing dinnerware and the like comprising a support for carrying molds through a mold charging zone, means for feeding charges of clay to said molds in said zone, and a mold conveyor formed for setting empty molds directly upon said support and for lifting loaded molds off the support and carrying them away.

24. Apparatus for manufacturing dinnerware and the like, comprising a horizontal support provided with spaced recesses therethrough for receiving molds, means for indexing said recesses from station to station, a die member for pressing clay on molds and a profile for jiggering clay at some of said stations, a plurality of mold carrying members, and means for moving said members downwardly through successive recesses at one of said stations and upwardly through successive recesses at another of said stations, whereby molds are deposited on said support by said downwardly moving members and removed from the support by said upwardly moving members.

25. Apparatus for manufacturing dinnerware and the like, comprising a horizontal support provided with spaced recesses therethrough for receiving molds, means for indexing said recesses from station to station, a feeder for charging the molds with clay, and a die for pressing clay on the molds and a profile for jiggering clay on the molds at some of said stations, a plurality of mold carrying members, and means for moving said members downwardly through successive recesses at one of said stations and upwardly through successive recesses at another of said stations, whereby molds are deposited on said support by said downwardly moving members and removed from the support by said upwardly moving members.

26. Apparatus for manufacturing dinnerware and the like comprising a support for carrying molds through a charging zone, means for charging molds with clay in said zone, and a mold conveyor formed for meshing mold carriers with said support to bring molds into register with the charging means.

27. Apparatus for manufacturing dinnerware and the like comprising a support for carrying molds through a fabricating zone, a pressing die formed for shaping clay in said fabricating zone, means for carrying said die in a circular path in said fabricating zone into and out of register with a mold therebelow, and a continuously moving mold conveyor formed and positioned for transporting molds containing clay to said support and for carrying them away therefrom after the material thereon has been shaped.

28. Apparatus for manufacturing dinnerware and the like comprising a support for carrying molds through a fabricating zone, a preforming die for shaping clay in said zone mounted to revolve in a circular path into and out of register with molds therebelow and a continuously moving mold conveyor for carrying molds containing clay to said support and for carrying them away after the clay has been shaped.

29. Apparatus for manufacturing dinnerware and the like comprising a support for carrying mold carriers through a fabricating zone, means for jiggering ware in said zone and a mold conveyor having mold carriers formed and positioned for meshing with said support.

30. Apparatus for manufacturing dinnerware and the like comprising a support for carrying molds through a fabricating zone, a profile tool in said zone supported and arranged to be moved in a circular path into and out of register with molds therebelow and a continuously moving mold conveyor for carrying molds containing clay to said support and carrying them away after the clay has been jiggered.

WILLIAM J. MILLER.